United States Patent Office 3,594,250
Patented July 20, 1971

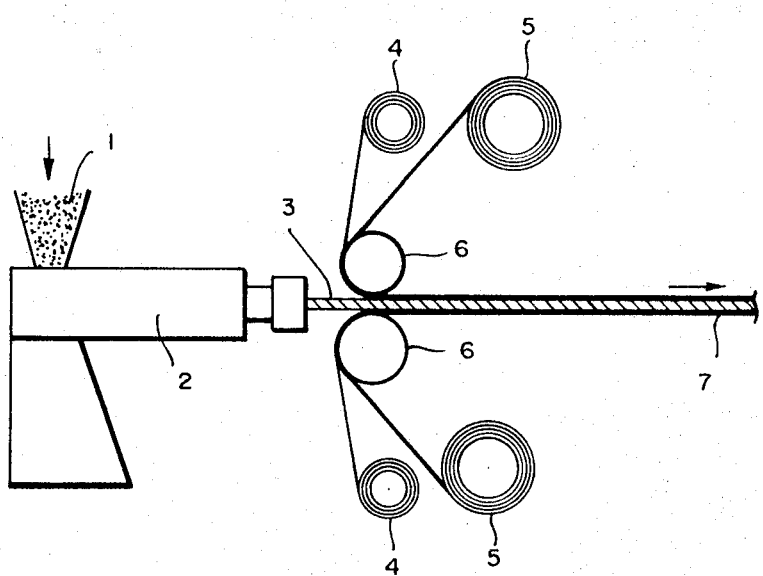

3,594,250
PRODUCTION OF PLANE BUILDING COMPONENTS COMPRISING A THERMOPLASTIC INNERLAYER WITH METAL OUTER PLIES
Heinz Mueller-Tamm and Dieter Mahling, Ludwigshafen (Rhine), Hans Frielingsdorf, Bad Duerkheim, and Alfred Hofmann, Mannheim, Germany, assignors to Badische Anilin- & Soda-Fabrik Aktiengesellschaft, Ludwigshafen (Rhine), Germany
Filed Sept. 6, 1968, Ser. No. 757,923
Claims priority, application Germany, Sept. 8, 1967, P 17 04 494.9
Int. Cl. B29c 19/00
U.S. Cl. 156—244                7 Claims

ABSTRACT OF THE DISCLOSURE

A process for the production of plane building components which are composed of a relatively thick inner ply of a thermoplastic and relatively thin outer plies of metal. In the process a board is first made continuously from a polyethylene by means of a screw extruder at elevated temperature, then this board is coated on both sides by means of a pair of rollers continuously with a film of a special terpolymer and thereafter with a sheet of metal. The whole is made into a sandwich assembly by the pressure of the rollers and then brought to ambient temperature.

---

The present invention relates to a process for the production of plane building components which are composed of a relatively thick inner ply of a thermoplastic and relatively thin outer plies of metal.

In conventional methods of this type, the building components are prepared for example using extrusion coating equipment. A board of polyethylene (the relatively thick inner ply of the finished building component) first has applied to it an adhesion promoter between the polyethylene and the outer plies of metal. This adhesion promoter is either a contact adhesive or a two-component adhesive based on an epoxide.

The said methods have the disadvantage that they are complicated and the adhesion between metal and plastic material (polyethylene) leaves much to be desired. When contact adhesives are used only low creep rupture strength and inadequate resistance to high temperatures are achieved. On the other hand bonding by means of two-component adhesives requires expensive apparatus and long curing times and gives relatively brittle joints; the components are moreover incapable of being deep-drawn. Furthermore, in order to obtain a relatively good bond it is always necessary to subject the metal and polyethylene surfaces to be bonded to a pretreatment, for example an oxidizing pretreatment.

The present invention has for its objects to provide a method of the type mentioned above which does not have the said disadvantages or has them in considerably smaller degree.

We have found that this object is achieved when the outer plies of metal are applied by means of a special adhesion-promoting layer under special process conditions to a special type of polyethylene (the relatively thick inner ply of the finished building component).

The present invention accordingly consists in a process of the type mentioned above in which a board having a thickness of from 1 to 20 mm. is prepared continuously from a polyethylene having a density of 0.918 to 0.930 g./ccm. and a melt index of 0.2 to 5 according to ASTM D 1238–65T) by means of a screw extruder at a temperature of the material of 120° to 220° C., preferably 160° to 180° C., the board thus obtained is then covered continuously on each side by means of a pair of rollers at temperature of the material of 100° to 220° C., preferably 120° to 160° C., first with a film having a thickness of 0.01 to 0.02 and consisting of a terpolymer containing 60 to 90 parts by weight of ethylene units, 0.5 to 20 parts of units of an ethylenically unsaturated carboxylic acid and 0.5 to 20 parts by weight of units of an ester of an ethylenically unsaturated carboxylic acid (the sum of the parts by weight being 100) and then with a sheet of metal having a thickness of from 0.05 to 1.5 mm., the whole is combined under a roller pressure of 0.1 to 4 kg./cm.$^2$, and the plane building component thus obtained is cooled, or allowed to cool, to ambient temperature.

In an advantageous embodiment of the process according to this invention use is made of a film of a terpolymer which contains 71 to 90 parts by weight of ethylene units, 3 to 9 parts by weight of units of an aliphatic ethylenically unsaturated carboxylic acid containing three to five carbon atoms and 1 to 20 parts by weight of units of an alkyl ester having (one to eight carbon atoms in the alkyl radical) of an aliphatic ethylenically unsaturated carboxylic acid having three to five carbon atoms in the molecule, the sum of the parts by weight being 100.

In a particularly advantageous embodiment of the process according to this invention use is made of a film of a terpolymer containing 71 to 90 parts by weight of ethylene units, 3 to 9 parts by weight of acrylic acid units and 1 to 20 parts by weight of tertiary-butyl acrylate units, the sum of the parts by weight being 100.

Commercial polyethylene having a density of 0.918 to 0.930 g./cm.$^3$ and a melt index of 0.2 to 5 is suitable for carrying out the process according to the invention. The adhesive film to be used according to the invention consists of a known terpolymer which can be processed into film by methods conventionally used for ethylene polymers. It is advantageous for the terpolymer used to have the following physical data: density: 0.9 to 1.1 g./cm.$^3$; crystalline fraction: less than 60%; melting range 70° to 120° C.; Shore hardness C: 50 to 90. Conventional metal sheeting may be used; for example sheeting of aluminum, copper, brass and steel has proved to be suitable.

The production of the plane building components may be carried out by means of conventional equipment for the production of plastics boards at a production rate of up to 2.5 meters per minute. This equipment consists in the present case of a screw extruder, a pair of rollers and a cooling zone. The bond between polyethylene, adhesive film and sheet metal is effected by bringing these components into contact in the nip of the two rollers, the polyethylene which is still hot causing the adhesive film to melt temporarily. After the bonding has taken place, the building component is cooled, or allowed to cool, to ambient temperature.

The accompanying drawing shows diagrammatically a hopper 1 containing granulated polyethylene, a screw extruder 2, the polyethylene board 3 formed, terpolymer films 4, metal sheeting 5, rollers 6 and the building component 7.

The invention is illustrated by the following example.

EXAMPLE

A board having a thickness of 3 mm. is extruded continuously from a polyethylene having a density of 0.918 g./cm.$^3$ and a melt index of 1.5 on a screw extruder having a 90 mm. screw and a sheeting die having a width of 600 mm. at a temperature of the material of 190° C. The board which is still hot (temperature about 160° C.)

is coated on each side with a 0.1 mm. thick film of a terpolymer (consisting of 88% by weight of ethylene units, 2.7% by weight of acrylic acid units and 9.3% by weight of tertiary-butyl acrylate units) and at the same time (on top of the film and on each side) with an aluminum foil having a thickness of 0.3 mm., the whole then being brought into intimate contact by passage through a pair of rollers heated to 70° C. under a roller pressure of 1 kg./cm.$^2$. The whole is then allowed to cool. The output of the screw extruder is about 180 kg. of polyethylene per hour. The corresponding production rate is 1.6 meters per minute.

We claim:

1. A process for the production of plane building components comprising a relatively thick inner ply of a thermoplastic polymer and relatively thin outer plies of metal, which process comprises extruding a sheet having a thickness of 1 to 20 mm. of a polyethylene having a density of 0.918 to 0.930 g./cm.$^3$ and a melt index (according to ASTM D 1238–65 T) of 0.2 to 5 at a temperature of the polyethylene of 120° to 220° C., applying on each face (a) first a film having a thickness of 0.01 to 0.2 mm. and consisting of a terpolymer containing in polymerized form 60 to 90 parts by weight of ethylene, 0.5 to 20 parts by weight of an ethylenically unsaturated carboxylic acid and 0.5 to 20 parts by weight of an ester of an ethylenically unsaturated carboxylic acid, the sum of the parts by weight being 100, and (b) then with metal sheeting 0.05 to 1.5 mm. in thickness, and pressing the sheets into a sandwich assembly under a roller pressure of 0.1 to 4 kg./cm.$^2$.

2. A process as claimed in claim 1 wherein a film is used which consists of a terpolymer containing 71 to 90 parts by weight of ethylene units, 3 to 9 parts by weight of units of an aliphatic ethylenically unsaturated carboxylic acid having three to five carbon atoms and 1 to 20 parts by weight of units of an alkyl ester (with one to eight carbon atoms in the alkyl radical) of an aliphatic ethylenically unsaturated carboxylic acid having three to five carbon atoms, the sum of the parts by weight being 100.

3. A process as claimed in claim 1 wherein a film is used which consists of a terpolymer containing 71 to 90 parts by weight of ethylene units, 3 to 9 parts by weight of acrylic acid units and 1 to 20 parts by weight of tertiary-butyl acrylate units, the sum of the parts by weight being 100.

4. A process as claimed in claim 1 wherein the temperature of the polyethylene during extrusion is 160° to 180° C.

5. A process as claimed in claim 1 wherein the temperature of the polyethylene during film application is 100° to 220° C.

6. A process as claimed in claim 1 wherein the temperature of the polyethylene during film application is 120° to 160° C.

7. A process as claimed in claim 1 wherein the terpolymer has the following physical data: density: 0.9 to 1.1 g./cm.$^3$; crystalline fraction: less than 60%; melting range: 70° to 120° C.; Shore hardness C: 50 to 90.

References Cited

UNITED STATES PATENTS

| | | | |
|---|---|---|---|
| 3,275,589 | 9/1966 | Alexander et al. | 156—332X |
| 3,320,115 | 5/1967 | Reid et al. | 156—334X |
| 3,442,752 | 5/1969 | Sandler et al. | 156—332X |
| 3,451,871 | 6/1969 | Bauer et al. | 156—244 |

BENJAMIN R. PADGETT, Primary Examiner

S. J. LECHERT Jr., Assistant Examiner

U.S. Cl. X.R.

156—309